(12) United States Patent
Ramesh et al.

(10) Patent No.: US 9,225,627 B2
(45) Date of Patent: Dec. 29, 2015

(54) REDISTRIBUTING ROUTES IN BACKBONE EDGE BRIDGE MULTI-CHASSIS LINK AGGREGATION GROUP TOPOLOGIES BETWEEN TWO ROUTING PROTOCOLS

(75) Inventors: Deepak Ramesh, Bangalore (IN); Vinuta K. S., Bangalore (IN)

(73) Assignee: Avaya Inc., Santa Clara, CA (US)

( * ) Notice: Subject to any disclaimer, the term of this patent is extended or adjusted under 35 U.S.C. 154(b) by 375 days.

(21) Appl. No.: 13/591,115

(22) Filed: Aug. 21, 2012

(65) Prior Publication Data

US 2014/0056176 A1 Feb. 27, 2014

(51) Int. Cl.
*H04L 12/751* (2013.01)
*H04L 12/781* (2013.01)
*H04L 12/709* (2013.01)

(52) U.S. Cl.
CPC .............. *H04L 45/02* (2013.01); *H04L 45/245* (2013.01); *H04L 45/52* (2013.01)

(58) Field of Classification Search
CPC ........ H04L 45/02; H04L 45/52; H04L 45/245
USPC .................................. 370/254, 255; 709/230
See application file for complete search history.

(56) References Cited

U.S. PATENT DOCUMENTS

2006/0165013 A1* 7/2006 Previdi et al. .................. 370/254
2007/0214275 A1* 9/2007 Mirtorabi et al. ............. 709/230

FOREIGN PATENT DOCUMENTS

WO 2007102965 A2 9/2007

OTHER PUBLICATIONS

Combined Search & Examination Report dated Dec. 16, 2013 cited in Corresponding Application No. GB 1311085.3.
Examination Report dated Dec. 11, 2014 for related Application No. GB 1311085.3.

* cited by examiner

*Primary Examiner* — Man Phan
*Assistant Examiner* — Mandish Randhawa

(57) ABSTRACT

A method, system and computer readable medium for redistributing routes in backbone edge bridge multi-chassis link aggregation group topologies between two routing protocols is described. The method can include learning, at a first node and a second node, a first routing table entry originating from a first side of a network and being received in a first protocol and creating, at the first node and the second node, and generating second routing entry information corresponding to the first routing table entry, in a second protocol different from the first protocol. The method can also include exchanging the second routing entry information between the first node and the second node. The first node and/or the second node add the second routing entry information to the routing table when the first routing entry is not present in the routing table and ignores the second routing entry information when the first routing entry is present in the routing table.

18 Claims, 2 Drawing Sheets

REDISTRIBUTING ROUTES IN BACKBONE EDGE BRIDGE MULTI-CHASSIS LINK AGGREGATION GROUP TOPOLOGIES BETWEEN TWO ROUTING PROTOCOLS

TECHNICAL FIELD

Embodiments relate generally to network data forwarding, and more particularly, to methods, systems and computer readable media for redistributing routes in backbone edge bridge multi-chassis link aggregation group topologies between two routing protocols.

BACKGROUND

Typically, when interconnecting access networks running a routing protocol (e.g., Open Shortest Path First (OSPF), Border Gateway Protocol (BGP), Routing Information Protocol (RIP) or the like) over a shortest path bridging (SPB) Core, using native Internet protocol (IP) shortcuts or L3VSNs, a router may be required to redistribute routes from a first routing protocol to a second routing protocol. For example, a router may be required to redistribute IP routes from OSPF/RIP into Intermediate System to Intermediate System (IS-IS) (IP) and redistribute from IS-IS (IP) into OSPF/RIP. When redistributing routes from a first routing protocol to a second routing protocol a potential may exist for a routing loop to be created.

With some conventional networks, a user may need to manually configure any route policies specifically for the purpose of avoiding routing loops in a particular topology (e.g., a shortest path bridging, or SPBM, network). In some conventional networks, a need may also exist to alter the route preference values of routing protocols for the purpose of avoiding routing loops.

Route-policies are typically static and can cause undesired effects in certain scenarios. For example, if a user seeks to avoid routing loops in a topology such as that shown in FIG. 1, using route policies, then a route policy may need to be configured on backbone edge bridge multi-chassis link aggregation group topologies BEB 1 102 to include "do not install 192.168.10.0/24 prefix from BEB 2 104 via ISIS protocol." Now, suppose the OSPF process crashes on BEB 1 102, which can cause there to be no OSPF session from BEB 1 102 to BEB 2 104 and node 106. However, BEB 2 104 still has an OSPF session with backbone core bridge BCB 108 and learns about 192.168.10.0/24 via OSPF and redistributes via ISIS to BEB 2 104, but BEB 1 102 would not install the route because of route policy, even though there is a path available from BEB 1 102 to node 106 via BEB 2 104.

Embodiments were conceived in light of the above-mentioned problems and limitations, among other things.

SUMMARY

An embodiment can include a method for redistributing routes in backbone edge bridge multi-chassis link aggregation group topologies between two routing protocols. The method can include learning, at a first node and a second node, a first routing table entry originating from a first side of a network and being received in a first protocol. The method can also include creating, at the first node and the second node, second routing entry information corresponding to the first routing table entry, in a second protocol different from the first protocol. The method can further include selectively setting a tag field for the first routing table entry originated from the first side of the network in the second routing entry information and exchanging the second routing entry information between the first node and the second node using a second routing protocol over the second network.

The method can include checking, at the first node and the second node, the tag field of the second routing entry information received in the second protocol, and when the tag field is set, searching a routing table associated with the first side of the network learned from the first protocol for the second routing entry information. The method can further include adding the second routing entry information to the routing table associated with a second side of the network when the first routing entry is not present in the routing table, and ignoring the second routing entry information when the first routing entry is present in the routing table.

An embodiment can include a system having one or more processors coupled to a nontransitory computer readable medium having stored thereon software instructions that, when executed by the one or more processors, cause the one or more processors to perform a series of operations. The operations can include learning, at a first node and a second node, a first routing table entry originating from a first side of a network and being received in a first protocol. The operations can also include creating, at the first node and the second node, second routing entry information regarding the first routing table entry, in a second protocol different from the first protocol. The operations can further include selectively setting a tag field for the first routing table entry originated from the first side of the network in the second routing entry information and exchanging the second routing entry information between the first node and the second node using a second routing protocol over the second network.

The operations can include checking, at the first node and the second node, the tag field of the second routing entry information received in the second protocol from the first node, and when the tag field is set, searching a routing table associated with the first side of the network learned from the first protocol for the first routing entry. The operations can further include adding the second routing entry information to the routing table associated with a second side of the network when the first routing entry is not present in the routing table, and ignoring the second routing entry information when the first routing entry information is present in the routing table.

Another embodiment can include a nontransitory computer readable medium having stored thereon software instructions that, when executed by a processor, cause the processor to perform a series of operations. The operations can include learning, at a first node and a second node, a first routing table entry originating from a first side of a network and being received in a first protocol. The operations can also include creating, at the first node and the second node, second routing entry information regarding the first routing table entry, in a second protocol different from the first protocol. The operations can further include selectively setting a tag field for the first routing table entry originated from the first side of the network in the second routing entry information and exchanging the second routing entry information between the first node and a second node using a second routing protocol over the second network.

The operations can include checking, at the first node and the second node, the tag field of the second routing entry information received in the second protocol, and when the tag field is set, searching a routing table associated with the first side of the network learned from the first protocol for the first routing entry. The operations can further include adding the second routing entry information to the routing table associated with a second side of the network when the first routing entry is not present in the routing table, and ignoring the second routing entry information when the first routing entry is present in the routing table.

The first side of the network can be an access side and the second side of the network can be a core side. The network can be a shortest path bridging network. The tag information can be sent along with routing entry information, such as a sub TLV of an ISIS TLV 135. The first protocol can be one of OSPF, RIP or BGP. The second protocol can be ISIS.

DETAILED DESCRIPTION

In general, an embodiment can include a method, system or computer readable medium for redistributing routes (or routing table entries or routing table entry information) in backbone edge bridge multi-chassis link aggregation group topologies between two routing protocols.

An embodiment can provide zero touch provisioning for interconnecting with an SPBm core network, in which a user may not be forced to configure any route policies specifically for the purpose of avoiding routing loops in the network topology.

Figure 1:
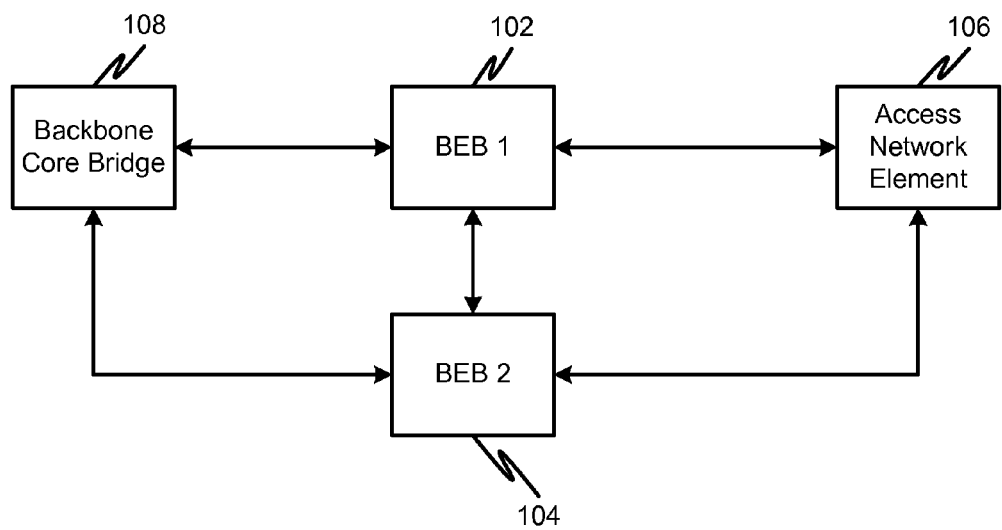
FIG. 1 is a diagram of an example network in accordance with at least one embodiment.

As shown in FIG. 1, a network 100 includes a first backbone edge bridge 102, a second backbone edge bridge 104, an access network element 106 and a backbone core bridge 108. The first and second backbone edge bridges (102 and 104) which are part of the multi-chassis link aggregation group topology can redistribute between two routing protocols according to the method set forth below relating to FIG. 2.

Figure 2:
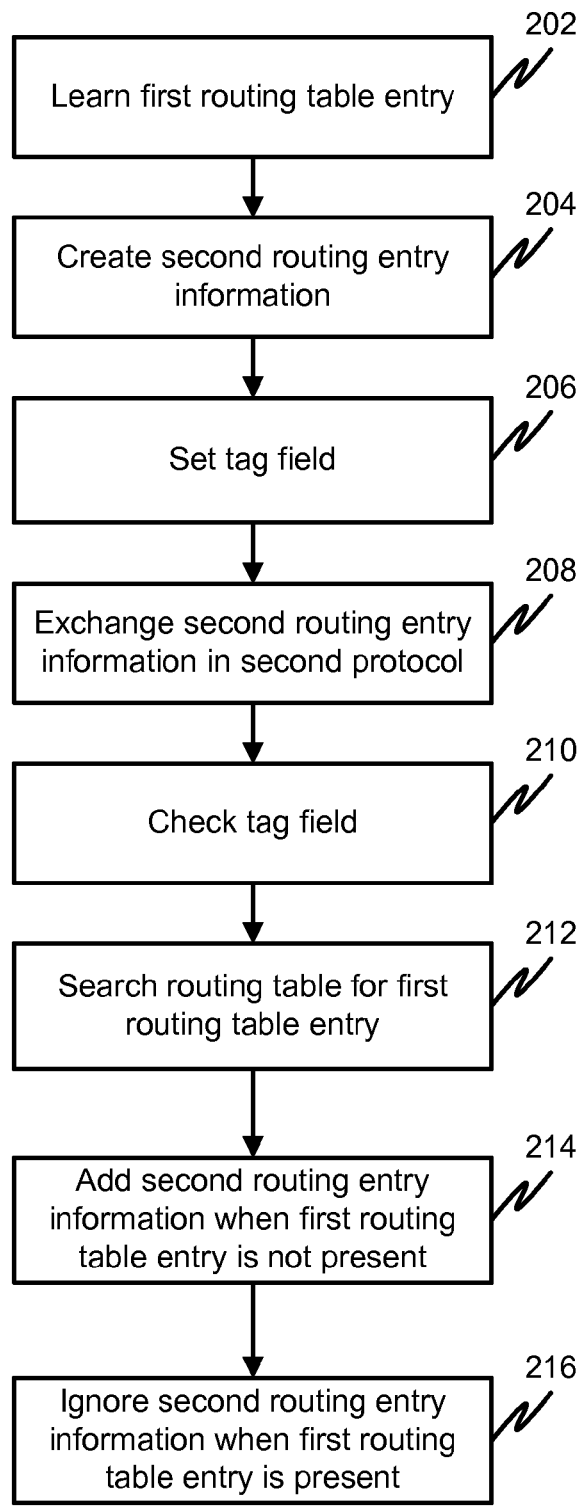
FIG. 2 is a flow chart showing an example method for redistributing routes in backbone edge bridge multi-chassis link aggregation group topologies between two routing protocols in accordance with at least one embodiment.

FIG. 2 is a flowchart of an example method of redistributing routes in backbone edge bridge multi-chassis link aggregation group topologies between two routing protocols. For purposes of illustrating example systems and structural elements, FIG. 1 can serve as a reference for the description below regarding FIG. 2.

As shown in FIG. 2, processing beings at 202, where a first and second node learns a first routing table entry originating from a first side of a network and being received in a first protocol (e.g., BEB 1 102 and BEB 2 104 may learn a routing table entry from access network element 106). Processing continues to 204.

At 204, the first node and second node create second routing entry information, in a second protocol different from the first protocol. For example, BEB 1 102 and BEB 2 104 can receive routing entry information in OSPF or RIP and create a second routing entry information message in ISIS. Processing continues to 206.

At 206, the first node and the second set a tag field in the second routing entry information in the second protocol, the tag can be used to indicate that the routing entry information was received from an access side of the network, for example. The tag field can be ISIS TLV 135 in order to advertise IP routes with in ISIS LSP packets. In TLV 135, there is already a sub-tlv type 1 defined as "Administrative tag" sub-tlv. The system can use the sub-tlv to tag the prefixes as learnt from SMLT access interface. Also, one of the available "Reserved bits" within ISIS TLV 185 can be used to carry L3VPN prefixes for the same purpose. Processing continues to 208.

At 208, the second routing entry information is exchanged between the first node and a second node (e.g. from 102 to 104) using a second routing protocol. Processing continues to 210.

At 210, the first node and the second node check the tag field of the second routing entry information. Processing continues to 212.

At 212, when the tag field is set, searching a routing table associated with the first side of the network for the first routing entry. Processing continues to 214.

At 214, the second routing entry information is added to the routing table associated with a second side of the network when the first routing entry is not present in the routing table. Processing continues to 216.

At 216, the second routing entry information is ignored when the first routing entry is present in the routing table (e.g., if a routing table entry corresponding to the second routing entry information as learned from the first protocol from the first side of the network is present in the routing table).

It will be appreciated that 202-216 can be repeated in whole or in part.

It will be appreciated that the modules, processes, systems, and sections described above can be implemented in hardware, hardware programmed by software, software instructions stored on a nontransitory computer readable medium or a combination of the above. A system for redistributing routes in backbone edge bridge multi-chassis link aggregation group topologies between two routing protocols, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, or the like.

It is, therefore, apparent that there is provided, in accordance with the various embodiments disclosed herein, systems, methods and computer readable media for redistributing routes in backbone edge bridge multi-chassis link aggregation group topologies between two routing protocols.

While the disclosed subject matter has been described in conjunction with a number of embodiments, it is evident that many alternatives, modifications and variations would be, or are, apparent to those of ordinary skill in the applicable arts. Accordingly, Applicant intends to embrace all such alternatives, modifications, equivalents and variations that are within the spirit and scope of the disclosed subject matter.

What is claimed is:

1. A method for redistributing routes in backbone edge bridge multi-chassis link aggregation group topologies between two routing protocols, the method comprising:
   learning, at a first node and a second node, a first routing table entry originating from a first side of a network and being received in a first protocol, wherein the first node and the second node are each backbone edge bridge devices that are part of a multi-chassis link aggregation group;
   creating, at the first node and the second node, second routing entry information regarding the first routing table entry, in a second protocol different from the first protocol, wherein the second protocol is intermediate-system to intermediate-system (ISIS);
   setting a tag field in the second routing entry information;
   exchanging the second routing entry information between the first node and the second node using the second protocol;
   checking, at the first node and the second node, the tag field of the second routing entry information;
   when the tag field is set, searching a routing table associated with the first side of the network for the second routing entry information;
   adding the second routing entry information to the a routing table associated with a second side of the network when the first routing entry is not present in the routing table associated with the first side of the network; and
   ignoring the second routing entry information when the first routing entry is present in the routing table associated with the first side of the network as learned from the first side of the network using the first protocol.

2. The method of claim 1, wherein the first side of the network is an access side.

3. The method of claim 1, wherein the second side of the network is a core side.

4. The method of claim 1, wherein the network is a shortest path bridging network.

5. The method of claim 1, wherein the tag field is carried inside a prefix advertisement message.

6. The method of claim 5, wherein the prefix advertisement message is a sub type-length-value (TLV) element of one of an ISIS TLV 135 and an ISIS TLV 185.

7. The method of claim 1, wherein the first protocol is one of open shortest path first (OSPF), routing information protocol (RIP) and border gateway protocol (BGP).

8. A system comprising:
   one or more processors coupled to a nontransitory computer readable medium having stored thereon software instructions that, when executed by the one or more processors, cause the one or more processors to perform a series of operations, the series of operations including:
      learning, at a first node and a second node, a first routing table entry originating from a first side of a network and being received in a first protocol, wherein the first node and the second node are each backbone edge bridge devices that are part of a multi-chassis link aggregation group;
      creating, at the first node and the second node, second routing entry information regarding the first routing table entry, in a second protocol different from the first protocol, wherein the second protocol is intermediate-system to intermediate-system (ISIS);
      setting a tag field in the second routing entry information;
      exchanging the second routing entry information between the first node and the second node using the second protocol;
      checking, at the first node and the second node, the tag field of the second routing entry information;
      when the tag field is set, searching a routing table associated with the first side of the network for the second routing entry information;
      adding the second routing entry information to a routing table associated with a second side of the network when the first routing entry is not present in the routing table associated with the first side of the network; and ignoring the second routing entry information when the first routing entry is present in the routing table associated with the first side of the network as learned from the first side of the network using the first protocol.

9. The system of claim 8, wherein the first side of the network is an access side.

10. The system of claim 8, wherein the second side of the network is a core side.

11. The system of claim 8, wherein the network is a shortest path bridging network.

12. The system of claim 8, wherein the tag field is carried inside a prefix advertisement message.

13. The system of claim 12, wherein the prefix advertisement message is a sub type-length-value (TLV) element of one of an ISIS TLV 135 and an ISIS TLV 185.

14. The method of claim 8, wherein the first protocol is one of open shortest path first (OSPF), routing information protocol (RIP) and border gateway protocol (BGP).

15. A nontransitory computer readable medium having stored thereon software instructions that, when executed by a processor, cause the processor to perform a series of operations comprising:
 learning, at a first node and a second node, a first routing table entry originating from a first side of a network and being received in a first protocol, wherein the first node and the second node are each backbone edge bridge devices that are part of a multi-chassis link aggregation group;
 creating, at the first node and the second node, second routing entry information regarding the first routing table entry, in a second protocol different from the first protocol, wherein the second protocol is intermediate-system to intermediate-system (ISIS); setting a tag field in the second routing entry information;
 exchanging the second routing entry information between the first node and the second node using the second protocol;
 checking, at the first node and the second node, the tag field of the second routing entry information;
 when the tag field is set, searching a routing table associated with the first side of the network for the second routing entry information;
 adding the second routing entry information to the a routing table associated with a second side of the network when the first routing entry is not present in the routing table associated with the first side of the network; and
 ignoring the second routing entry information when the first routing entry is present in the routing table associated with the first side of the network as learned from the first side of the network using the first protocol.

16. The nontransitory computer readable medium of claim 15, wherein the tag field is prefix advertisement message.

17. The nontransitory computer readable medium of claim 16, wherein the prefix advertisement message is a sub type-length-value (TLV) element of one of an ISIS TLV 135 and an ISIS TLV 185.

18. The nontransitory computer readable medium of claim 15, wherein the first protocol is one of open shortest path first (OSPF), routing information protocol (RIP) and border gateway protocol (BGP).

\* \* \* \* \*